US008660902B2

(12) United States Patent
Coulter

(10) Patent No.: US 8,660,902 B2
(45) Date of Patent: Feb. 25, 2014

(54) METHODS AND SYSTEMS FOR SELLING APPAREL

(75) Inventor: Lori A. Coulter, Clayton, MO (US)

(73) Assignee: Lori Coulter, LLC, St. Louis, MO (US)

(*) Notice: Subject to any disclaimer, the term of this patent is extended or adjusted under 35 U.S.C. 154(b) by 449 days.

(21) Appl. No.: 10/897,529

(22) Filed: Jul. 23, 2004

(65) Prior Publication Data

US 2006/0020482 A1 Jan. 26, 2006

(51) Int. Cl.
G06Q 30/00 (2012.01)

(52) U.S. Cl.
USPC .......................................... 705/26.1

(58) Field of Classification Search
USPC .................. 705/26, 27, 26.1, 27.2; 2/456
See application file for complete search history.

(56) References Cited

U.S. PATENT DOCUMENTS

| 4,149,246 A | 4/1979 | Goldman |
| 4,261,012 A | 4/1981 | Maloomian |
| 4,467,349 A | 8/1984 | Maloomian |
| 4,539,585 A | 9/1985 | Spackova et al. |
| 4,598,376 A | 7/1986 | Burton et al. |
| 4,916,624 A | 4/1990 | Collins et al. |
| 4,916,634 A | 4/1990 | Collins et al. |
| 5,163,006 A | 11/1992 | Deziel |
| 5,163,007 A | 11/1992 | Slilaty |
| 5,255,352 A | 10/1993 | Falk |
| 5,363,476 A | 11/1994 | Kurashige et al. |
| 5,495,568 A | 2/1996 | Beavin |
| 5,515,268 A | 5/1996 | Yoda |
| 5,551,021 A | 8/1996 | Harada et al. |
| 5,615,318 A | 3/1997 | Matsuura |
| 5,680,314 A | 10/1997 | Patterson et al. |
| 5,680,528 A | 10/1997 | Korszun |
| 5,724,484 A | 3/1998 | Kagami et al. |
| 5,724,522 A | 3/1998 | Kagami et al. |
| 5,768,135 A | 6/1998 | Park et al. |
| 5,850,222 A | 12/1998 | Cone |
| 5,930,769 A * | 7/1999 | Rose ............................. 705/27 |
| 5,937,081 A | 8/1999 | O'Brill et al. |
| 6,246,994 B1 | 6/2001 | Wolven et al. |
| 6,310,627 B1 | 10/2001 | Sakaguchi |
| 6,404,426 B1 | 6/2002 | Weaver |
| 6,516,240 B2 | 2/2003 | Ramsey et al. |
| 6,546,309 B1 | 4/2003 | Gazzuolo |
| 6,564,118 B1 | 5/2003 | Swab |
| 6,665,577 B2 * | 12/2003 | Onyshkevych et al. ........ 705/26 |
| 6,701,207 B1 | 3/2004 | Gazzuolo |
| 6,711,455 B1 | 3/2004 | Holloway et al. |
| 6,817,979 B2 | 11/2004 | Nihtila |
| 6,901,379 B1 | 5/2005 | Balter et al. |
| 6,903,756 B1 | 6/2005 | Giannini |
| 6,968,075 B1 | 11/2005 | Chang |

(Continued)

Primary Examiner — Mila Airapetian
(74) Attorney, Agent, or Firm — Dennis A. Bennett; Gale W. Starkey

(57) ABSTRACT

Methods, systems, and articles of manufacture consistent with the present invention provide a garment that complements one or more figure characteristics. A garment is selected from a collection containing a number of garments each of which is categorized as being within one or more garment types. Information regarding a person's body shape is obtained. The body shape information is analyzed to identify at least one figure characteristic of the body shape. At least one garment type is identified that compliments the identified figure characteristic. Garments within the collection that are categorized as being within the identified complimentary garment type are identified. The identified garments are recommended. An input corresponding to a desired garment selected from the recommended identified garments is received.

37 Claims, 16 Drawing Sheets

(56) References Cited

U.S. PATENT DOCUMENTS

| | | | |
|---|---|---|---|
| 7,003,369 B1 | 2/2006 | Gage | |
| 7,013,232 B2 | 3/2006 | Fuller, III et al. | |
| 7,020,538 B2 | 3/2006 | Luhnow | |
| 7,194,327 B2* | 3/2007 | Lam | 705/26 |
| 2001/0026272 A1 | 10/2001 | Feld et al. | |
| 2002/0004763 A1* | 1/2002 | Lam | 705/26 |
| 2002/0077922 A1 | 6/2002 | Srinivasan | |
| 2002/0166254 A1 | 11/2002 | Liebermann | |
| 2002/0188372 A1 | 12/2002 | Lane et al. | |
| 2003/0028436 A1* | 2/2003 | Razumov | 705/26 |
| 2004/0049309 A1 | 3/2004 | Gardner et al. | |
| 2004/0078285 A1* | 4/2004 | Bijvoet | 705/26 |
| 2004/0083142 A1* | 4/2004 | Kozzinn | 705/27 |
| 2004/0118908 A1 | 6/2004 | Ando et al. | |

* cited by examiner

Figure 6

| Typical sizes | | | | | | | | |
|---|---|---|---|---|---|---|---|---|
| Typical dress size* | 0 | 2 | 4 | 6 | 8 | 10 | 12 | |
| | 14 | 16 | 18 | 20 | 22 | 24 | 26 | |
| Ever different size* | no | up one size | down one size | | | | | |
| Size category*** | extra small - 0 | small - 1 | medium - 2 | large/full - 3 | plus size - 4 | plus plus size - 5 | | |
| Typical bra band* | 30 | 32 | 34 | 36 | 38 | 40 | 42 | |
| Typical cup size* | AA | A | B | C | D | DD | | |
| Shoe size* | 4.5 | 5 | 5.5 | 6 | 6.5 | 7 | 7.5 | |
| | 8 | 8.5 | 9 | 9.5 | 10 | 10.5 | 11 | |
| | 11.5 | 12 | 12.5 | 13 | Other | | | |

| Body Shape Analysis | A | B | C | D | E | F | G |
|---|---|---|---|---|---|---|---|
| Cust. defined body shape* | | | | | | | |
| Emphasize** | bust | waist | seat | hips | thighs | tummy | arms/legs |
| Camouflage/minimize** | bust | waist | seat | hips | thighs | tummy | arms/legs |
| Bra** | light shelf bra | soft cup bra | underwire | cup/underwire | minimizer | padded insert | molded bra |
| Shoulders* | broad | average | rounded | narrow | | | |
| Bust* | flat/small | average | full/curvy | voluminous | | | |
| Hips* | straight | average | full/curvy | | | | |
| Thighs* | thin | average | full | | | | |
| Arms/legs* | thin | average | full | | | | |
| Seat* | flat | average | full | | | | |
| Tummy* | flat | average | round | | | | |
| Torso* | short | average | long | | | | |
| Legs* | short | average | long | | | | |
| Back* | high | average | low | | | | |

Figure 7

Primary Body Shapes and Secondary Figure Goals

| Secondary Figure Goals | Primary Body Shapes (and typical secondary figure goals by shape) | | | | | | |
|---|---|---|---|---|---|---|---|
| | A | B | C | D | E | F | G |
| | Broad shoulders & large bust | Athletic build | Full and round | Pear shape | Hourglass | Pregant | None |
| Shoulders: minimize broad shoulders | x | x | | | | | |
| Shoulders: accommodate rounded or small shoulders | | | x | | | | |
| Bust: enhance small bust | | x | | | | | |
| Bust: minimize large bust | x | | | x | x | | |
| Bust: provide bust support | x | | x | x | x | | |
| Hip: minimize hip and thigh | | | | x | x | | |
| Waist: define waist | | x | x | | x | | |
| Tummy: provide control | | | x | x | x | | |
| Seat: cover full seat | | | x | x | x | | |
| Seat: support flat seat | x | x | x | | | | |
| Legs/arms: minimize thick extremities | | | | x | x | | |
| Legs: lengthen short legs | | | | x | | | |
| Torso lenth: accommodate short torso | | | | x | | | |
| Torso length: accommodate long torso | | | | x | | | |
| Size: accommodate petite sizes | | | | | | | |
| Size: accommodate full and plus sizes | | | | | | | |

*****Note: primary body shapes and secondary figure goals may change.

Figure 8

Contact info

| | | | | | |
|---|---|---|---|---|---|
| Name | first | middle | last | mrs/miss/ms/mr | |
| Billing Address | street address 1 | street address 2 | city | state | zip |
| Shipping Address | street address 1 | street address 2 | city | state | zip |
| Phone | area code | number | | | |
| Email | email address 1 | | | | |
| Birthday* | month | day | year | | |
| Credit card info*** | card 1 | card 2 | | | |

Usage Information

| | | | | | |
|---|---|---|---|---|---|
| Purchased for** | vacation | cruise | special event | sports | general usage | other |
| Where worn** | pool | lake | beach | yard | boating/sailing | other |
| Expected frequency* | daily | weekly | occasionally | rarely | | |

Style Prefs

| | | | | |
|---|---|---|---|---|
| Swimsuit styles** | one-piece | bikini | tankini | | |
| Fashion preferences** | natural | romantic | classic | contemporary | edgy |
| Most flattering colors* | cool (sea) | warm (sun) | | | |
| Favorite swim colors** | color group 1 | color group 2 | color group 3 | color group 4 | sporty |

Figure 9

Measurements*

| | | | |
|---|---|---|---|
| Date of capture/location | month | day | year |
| Torso length | | | |
| Leg length | right | left | |
| Arm length | right | left | |
| Arm thickness | right | left | |
| Shoulder width | | | |
| Arm hole to arm hole | | | |
| Full bust | | | |
| Bust point to bust point | | | |
| Cup size | right | left | |
| Rib cage/bra band | | | |
| Waist | | | |
| High hip | | | |
| Low hip | | | |
| leg width | right | left | |
| Thigh | | | |
| Halter strap length | | | |
| Bra strap length | | | |
| Height | | | |

METHODS AND SYSTEMS FOR SELLING APPAREL

BACKGROUND OF THE INVENTION

The present invention generally relates to the field of selling apparel and, more particularly, to automated methods and systems for selling apparel.

Apparel customers typically spend a large amount of time shopping for a garment by sorting through large garment inventories. In the case of swimwear, a customer may try on as many as twenty-five swimsuits and shop in up to eight stores to buy a single garment, and yet still be dissatisfied.

Some of the problems customers face include finding garment designs that meet their fashion preferences, are flattering, and fit. However, few customers understand which garment designs will satisfy these objectives. This problem is compounded by the limited garment selections available at conventional retail stores. Typically, customers receive advice from salespeople in retail stores, but the advice is subjective and directed to garments available in that store.

One approach that customers may take to obtain a better-fitting garment is to have an off-the-rack garment tailored thereby providing a customized fit from an existing garment pattern. While this approach allows for a better fit of an off-the-rack item for an individual, it fails to provide for customized designs or fashions. Further, that approach fails to provide objective advice regarding flattering designs for a particular customer.

There is a need for mass customization technology that provides objective recommendations for made-to-order and off-the-rack garments that are flattering and provides those garments.

SUMMARY OF THE INVENTION

Methods, systems, and articles of manufacture consistent with the present invention provide garments that can visually enhance characteristics of a person's body shape. A person's body shape information is analyzed to identify at least one figure characteristic of the body shape, such as broad shoulders. A garment is recommended that visually enhances the at least one figure characteristic. For example, the garment can visually reduce the breadth of the person's broad shoulders.

In an illustrative example, the customer accesses a web site that prompts the customer for information and displays garments for purchase. The web site is accessed via a client data processing system, such as a personal computer, which is located, for example, at a retail store or at the customer's home. The web site is executed by a host data processing system. While accessing the web site, the customer enters their measurements, information about themselves, and their fashion preferences, such as style, usage and color. The customer's measurements can also be obtained using a body scanner that obtained a three-dimensional representation of the customer's body shape. In addition to the customer's measurements, the customer can also enter secondary figure goals, which identify characteristics of the customer's figure that they would like to adjust, enhance or minimize.

Once the customer's information is received by the host data processing system, a recommendation engine suggests styles, patterns, and colors based on the customer's information. The recommendation can be for made-to-order or off-the-rack garments. The customer can use these recommendations or opt to make their own selections. The recommendation engine can also suggest accessories to accompany the selected garment. The customer's selections can be viewed in a virtual dressing room where the garments and accessories are presented on a two-dimensional or three-dimensional representation of the customer's body shape.

Then, the customer can order the garment on the web site. The host data processing system forwards the order information to the garment manufacturer, which obtains or makes the garment and ships it to the customer's shipping address. The customer's personal and order information are stored in a database for use when the customer subsequently accesses the web site.

Thus, unlike conventional apparel shopping methods, methods, systems and articles of manufacture consistent with the present invention objectively recommend garments that can visually enhance characteristics of a person's body shape. The customer does not have to rely on the subjective opinion of a salesperson. Further, conventional apparel shopping typically involves recommending tailoring modifications to off-the-rack garments with no objective recommendations on the how the garments can flatter the person's figure. Methods, systems, and articles of manufacture consistent with the present invention recommend and provide made-to-order or off-the-rack garments based on decisions made during the customer's ordering session. Therefore, the garment is more customized to the customer's fit and figure goals than typical made-to-order and off-the-rack garments.

In accordance with methods consistent with the present invention, a method in a data processing system having a program for selecting a garment from a collection containing a number of garments each of which is categorized as being within one or more garment types is provided. The method comprises the steps of: obtaining information regarding a person's body shape; analyzing the body shape information to identify at least one figure characteristic of the body shape; identifying at least one garment type that compliments the identified figure characteristic; identifying garments within the collection that are categorized as being within the identified complimentary garment type; recommending the identified garments; and receiving an input corresponding to a desired garment selected from the recommended identified garments.

In accordance with articles of manufacture consistent with the present invention, a computer-readable medium containing instructions that cause a data processing system having a program to perform a method for selecting a garment from a collection containing a number of garments each of which is categorized as being within one or more garment types is provided. The method comprises the steps of: obtaining information regarding a person's body shape; analyzing the body shape information to identify at least one figure characteristic of the body shape; identifying at least one garment type that compliments the identified figure characteristic; identifying garments within the collection that are categorized as being within the identified complimentary garment type; recommending the identified garments; and receiving an input corresponding to a desired garment selected from the recommended identified garments.

In accordance with systems consistent with the present invention, a data processing system for selecting a garment from a collection containing a number of garments each of which is categorized as being within one or more garment types is provided. The data processing system comprises: a memory having a program that obtains information regarding a person's body shape, analyzes the body shape information to identify at least one figure characteristic of the body shape, identifies at least one garment type that compliments the identified figure characteristic, identifies garments within the collection that are categorized as being within the identified complimentary garment type, recommends the identified garments, and receives an input corresponding to a desired garment selected from the recommended identified garments; and a processing unit that runs the program.

In accordance with systems consistent with the present invention, a data processing system for selecting a garment from a collection containing a number of garments each of which is categorized as being within one or more garment types is provided. The data processing system comprises: means for obtaining information regarding a person's body shape; means for analyzing the body shape information to identify at least one figure characteristic of the body shape; means for identifying at least one garment type that compliments the identified figure characteristic; means for identifying garments within the collection that are categorized as being within the identified complimentary garment type; means for recommending the identified garments; and means for receiving an input corresponding to a desired garment selected from the recommended identified garments.

Other features of the invention will become apparent to one with skill in the art upon examination of the following figures and detailed description. It is intended that all such additional systems, methods, features and advantages be included within this description, be within the scope of the invention, and be protected by the accompanying drawings.

BRIEF DESCRIPTION OF THE DRAWINGS

The accompanying drawings, which are incorporated in and constitute a part of this specification, illustrate an implementation of the invention and, together with the description, serve to explain the advantages and principles of the invention. In the drawings.

FIG. 6 is a screen shot of a client computer display screen that prompts the customer to select the customer's typical sizes and enter their body-shape information;

FIG. 7 is a screen shot a screen shot of a client computer display screen that prompts the customer to select secondary figure goals associated with their primary body shape;

FIG. 8 is a screen shot of a client computer display screen that prompts the customer to enter their contact information, their preferences for how and when they plan to use the apparel, and their style preferences;

FIG. 9 is a screen shot of a client computer display screen that prompts the customer to enter their measurement information;

DETAILED DESCRIPTION OF THE INVENTION

Reference will now be made in detail to an implementation in accordance with methods, systems, and articles of manufacture consistent with the present invention as illustrated in the accompanying drawings. Wherever possible, the same reference numbers will be used throughout the drawings and the following description to refer to the same or like parts.

Methods, systems, and articles of manufacture consistent with the present invention provide garments that can visually enhance characteristics of a person's body shape. A person provides their measurements and body shape information to a host program. The host program analyzes the person's body shape information to identify at least one figure characteristic of the body shape, such as broad shoulders. Then, the host program recommends a garment that visually complements the identified figure characteristic. For example, the garment visually reduces the breadth of the person's broad shoulders. The recommended garment can be a made-to-order or off-the-rack garment.

Figure 1:
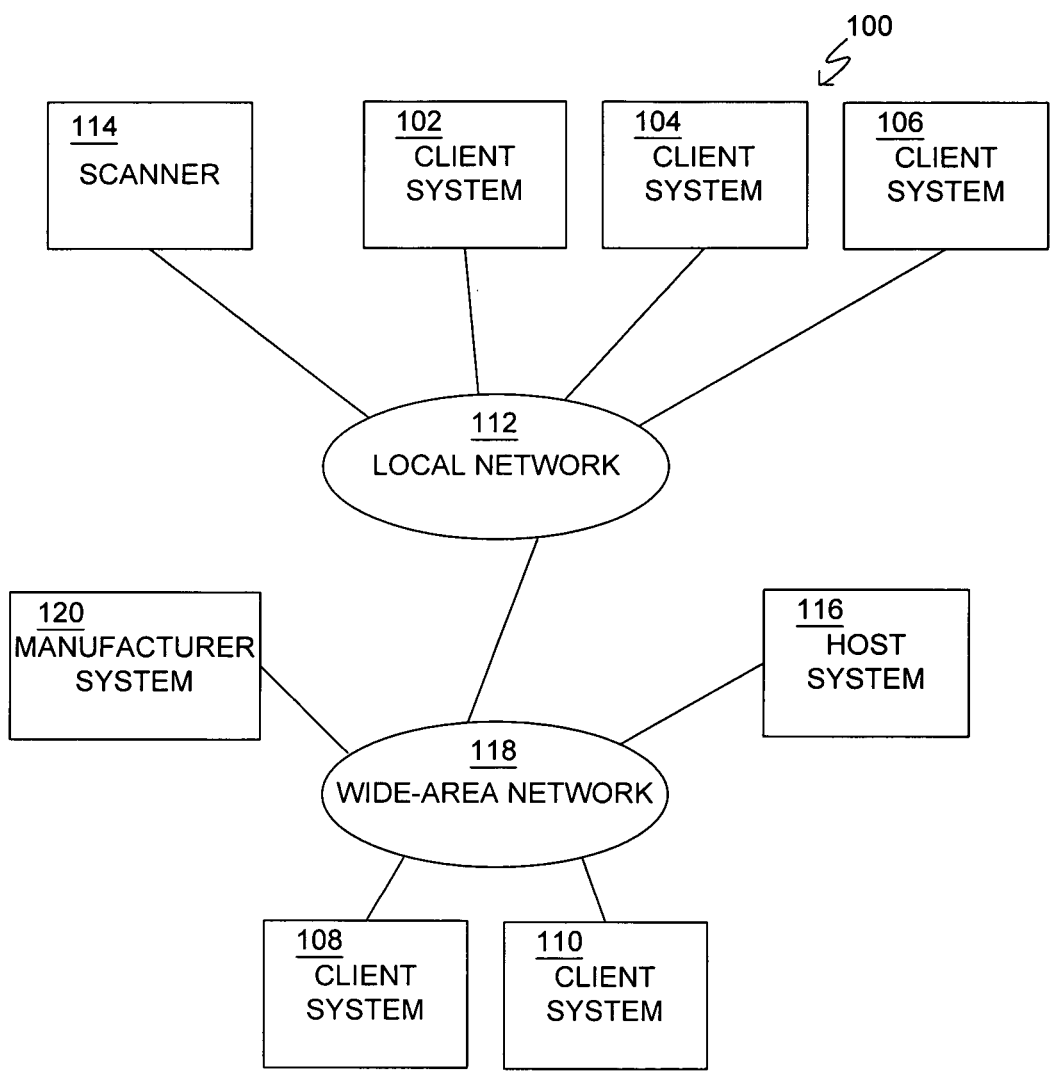
FIG. 1 is a schematic diagram of a system for providing apparel consistent with the present invention.

FIG. 1 depicts a block diagram of a system 100 for selling apparel consistent with the present invention. As illustrated, the system 100 generally comprises a plurality of client data processing systems 102, 104, 106, 108 and 110 at which customer information is entered. In the illustrative example, client data processing systems 102, 104 and 106 are connected via a local network 112. A body scanner 114 is also connected to network 112. Client data processing systems 102, 104 and 106 and body scanner 114 can represent, for example, customer information entry stations that communicate via a local-area network in a retail store. For example, the body scanner can scan a customer's body to obtain measurements and additional information about the customer, such as the customer's name and style preferences, can be entered via client data processing system 102.

Information about the customer is received and processed by a host data processing system 118, which communicates with the client data processing systems and the body scanner via a wide-area network 118, which is connected to the local area network 112. The wide-area network can be, for example, the Internet. Client data processing systems 108 and 100 communicate with the host data processing system via the wide-area network and represent, for example, personal computers in other locations, such as in the customer's home or office. The client and host data processing systems the body scanner will be described in more detail below.

Figure 2:
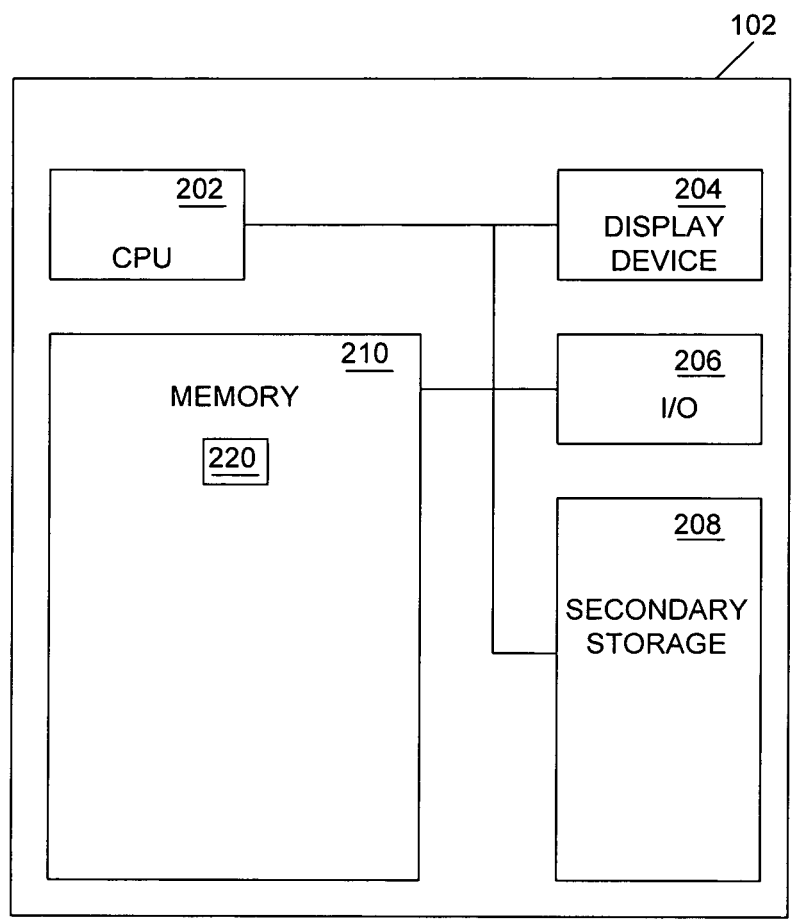
FIG. 2 is a block diagram of a host data processing system consistent with the present invention.

FIG. 2 depicts an illustrative client data processing system, such as client data processing system 102, in more detail. Client data processing system 102 comprises a central processing unit (CPU) or processor 202, a display device 204, an input/output (I/O) unit 206, a secondary storage device 208, and a memory 210. The client data processing system may further comprise standard input devices such as a keyboard, a mouse or a speech processing means (none of which are illustrated).

Memory 210 comprises a client program 220. As will be described in more detail below, client program 220 receives input about the client from the user and transmits the received input to a host program 320. In the illustrative example, the client program is a browser program that communicates with the host data processing system via the Internet.

Figure 3:
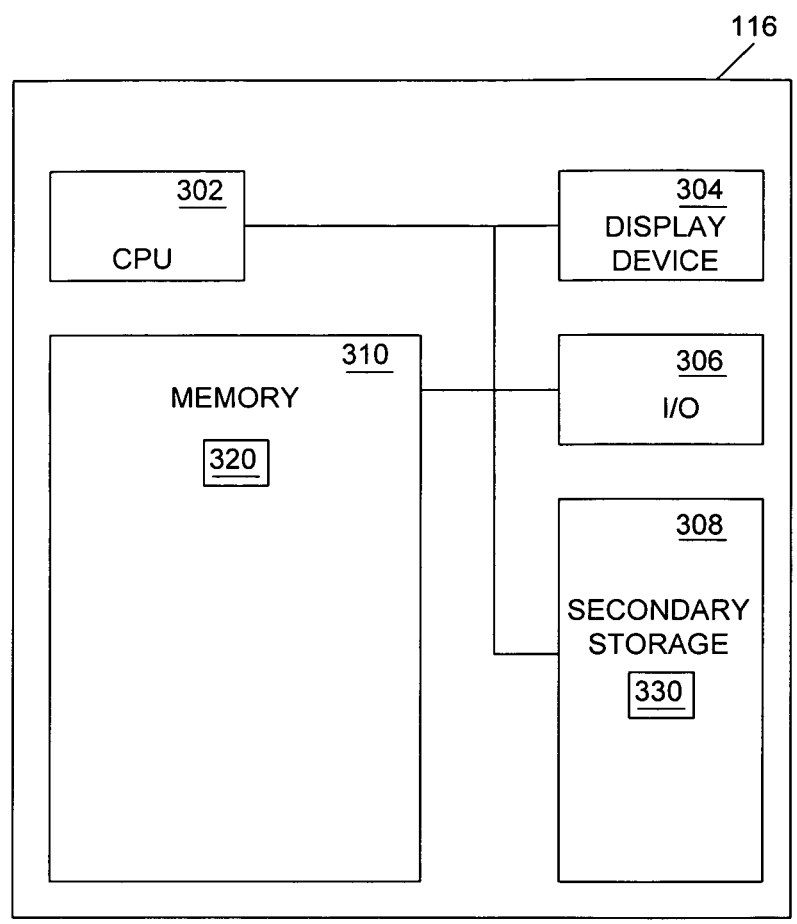
FIG. 3 is a block diagram of a client data processing system consistent with the present invention.

FIG. 3 depicts a schematic block diagram of host data processing system 116 in more detail. Host data processing system 116 comprises a central processing unit (CPU) or processor 302, a display device 304, an input/output (I/O) unit 306, a secondary storage device 308, and a memory 310. The host data processing system may further comprise standard input devices such as a keyboard, a mouse or a speech processing means (none of which are illustrated).

Memory 310 comprises a host program 320, which receives the inputted customer information, analyzes the customer information, and outputs recommended apparel from a database 330 of apparel options. The database also stores information about customers. The host program will be described in more detail below.

In the illustrative example, the various programs described herein are implemented in the PHP programming language, however, the programs can be implemented in one or more different programming languages.

One having skill in the art will appreciate that the client program and the host program can reside in memory on a system other than the depicted data processing system. The host program and client programs may comprise or may be included in one or more code sections containing instructions for performing their respective operations. Although the host and client programs are described as being implemented as software, the present implementation may be implemented as a combination of hardware and software or hardware alone. Also, one having skill in the art will appreciate that the host and client programs may comprise or may be included in a data processing device, which may be a client or a server, communicating with the respective host or client data processing system.

Although aspects of methods, systems, and articles of manufacture consistent with the present invention are depicted as being stored in memory, one having skill in the art will appreciate that these aspects may be stored on or read from other computer-readable media, such as secondary storage devices, like hard disks, floppy disks, and CD-ROM; or other forms of ROM or RAM either currently known or later developed. Further, although specific components of data processing systems have been described, one having skill in the art will appreciate that a data processing system suitable for use with methods, systems, and articles of manufacture consistent with the present invention may contain additional or different components.

The host and client data processing systems can also be implemented as client-server data processing systems. In that case, the host program or client program can be stored on the respective data processing system as a client, and some or all of the steps of the processing described below can be carried out on a remote server, which is accessed by the client over a network. The remote server can comprise components similar to those described above with respect to the host or client data processing system, such as a CPU, an I/O, a memory, a secondary storage, and a display device.

The customer initiates an apparel purchase via one of the client computers, such as a client computer located in a retail store or in the customer's home. The client program on the client computer provides web browser functionality that enables the customer to access an apparel shopping web site, which is operated by the host computer. The host program receives information about the customer and the customer's apparel choices, processes the customer's order, and stores the customer's information for future purchases.

Figure 4:
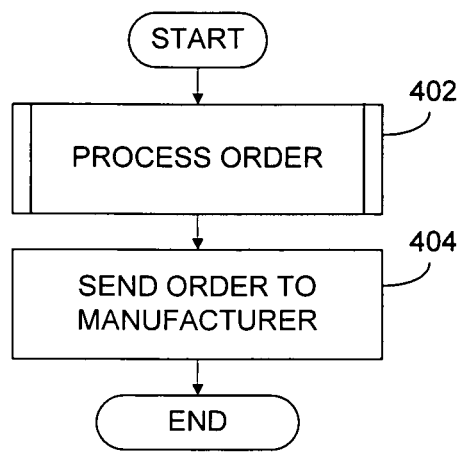
FIG. 4 is a flow diagram of the exemplary steps performed by the host data processing system consistent with the present invention.
Figure 5:
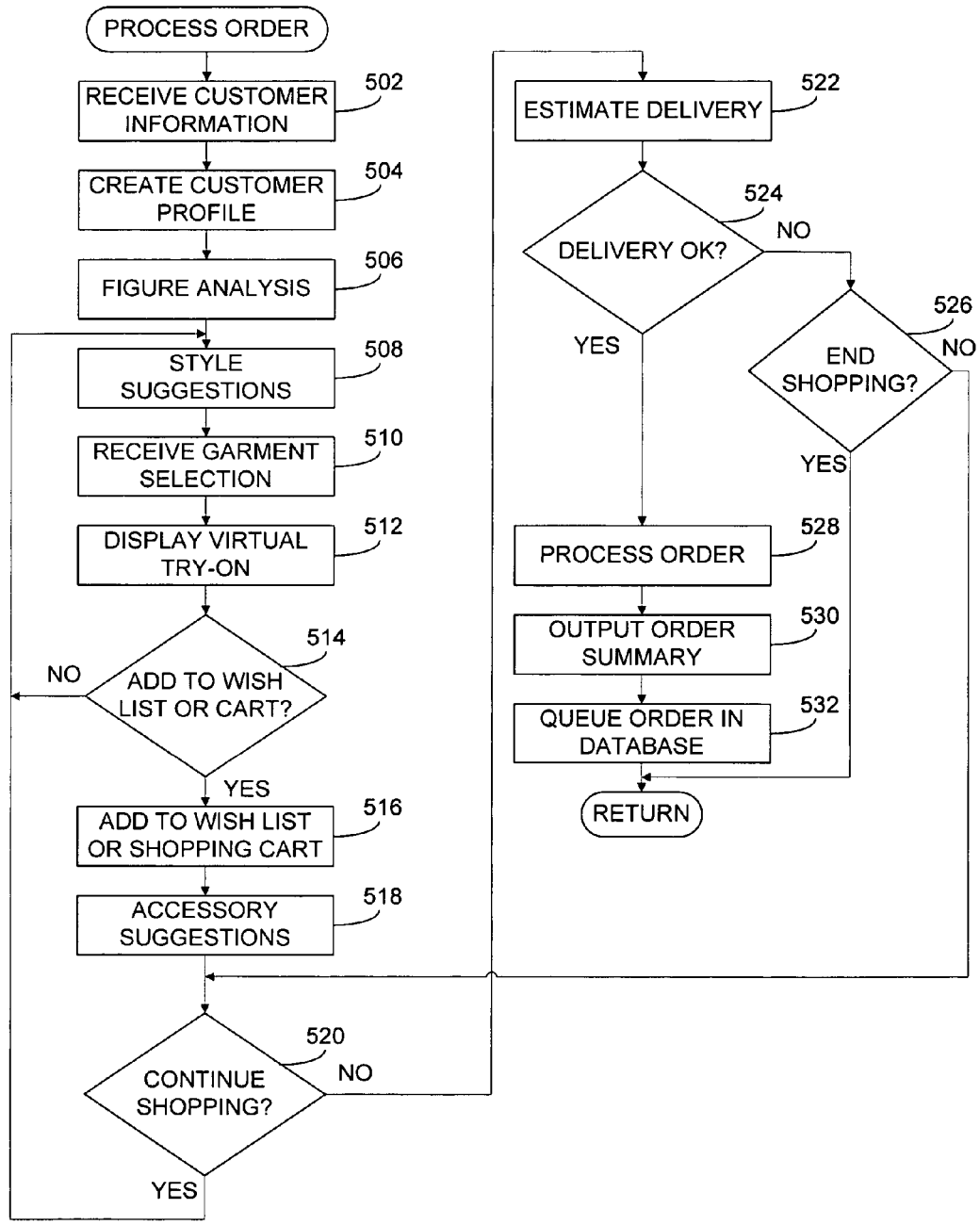
FIG. 5 is a flow diagram of the exemplary steps performed by the host data processing system for processing a customer's order consistent with the present invention.

FIG. 4 depicts a flow diagram illustrating exemplary steps performed by the host program. As shown, the host program first processes a customer's order (step 402). FIG. 5 is a flow diagram illustrating step 402 in more detail. In step 502, the host program first receives information about the customer. In the illustrative example, the customer enters their information at the client computer by answering questions in a web-page-based questionnaire. The customer information includes, but is not limited to, information regarding the customer's typical sizing, primary body shape, secondary figure goals, fit preferences, fashion preferences with regards to style, color and print, and contact and shipping information. Further, the customer's measurements are entered manually or captured digitally via the body scanner.

FIGS. 6-9 depict illustrative screen shots that are presented to the customer on the client computer's display device for entering the customer information. One having skill in the art will appreciate that the customer information is not limited to the illustrative information shown in FIGS. 6-9. Additional and alternative customer information can be entered. For example, the customer can choose secondary figure goals other that those depicted in FIG. 7 and the customer can enter measurements other than those depicted in FIG. 9. Further, for some of the entries, the customer can enter more than one selection. For example, for the information shown in FIG. 6, the customer can choose to emphasize bust and hips and deemphasize waist, seat and tummy. A brief summary of the illustrative customer information in FIGS. 6-9 is provided below.

FIG. 6 shows a screen shot that allows the customer to select the customer's typical sizes and enter their body-shape information. The illustrative size information in FIG. 6 can include typical dress size, whether the customer ever uses a different size than the dress size selected, size category, typical bra band, typical cup size, shoe size. The illustrative body shape information in FIG. 6 can include a customer-defined body shape, such as body shape A, B, C, D, E, F or G. Each of these body shapes is associated with a typical body shape, such as a "pear shape." These body shapes are illustrative, and additional or alternative body shapes can by used. Further, a different naming convention for the body shapes can be used. The body shapes shown in FIG. 6 can include body shape A for broad shoulders and large bust, B for an athletic build, C for full and round, D for pear shape, E for hourglass, F for pregnant, and G for none of the above. In addition to the body shape, the customer can also make selections for emphasizing a body characteristic, camouflaging or minimizing a body characteristic, bra type, shoulder type, bust type, hip type, thigh type, arm and leg type, seat type, tummy type, torso type, leg type and back type. As noted above with reference to the customer information in FIGS. 6-9, additional or alternative customer information can also be entered.

FIG. 7 shows a screen shot that allows the customer to select secondary figure goals associated with their primary body shape. Figure goals include goals to enhance characteristics of the figure. The figure goals can include, but are not limited to, making the figure characteristic appear more defined, minimized, accommodated, enhanced, minimized, supported, controlled, covered, larger, smaller, longer, shorter, fuller or narrower. The figure characteristic can be any part of the body, such as the shoulders, bust, hip, thighs, waist, tummy, seat, legs, arms, torso length, back, or size.

With respect to the screen shot of FIG. 8, the customer enters their contact information, their preferences for how and when they plan to use the apparel, and their style preferences. The illustrative contact information can include name, billing address, shipping address, telephone number, email address, birthday, and credit card information. The usage information can include the reason for their purchase, where the garment may be worn, and the expected frequency of wearing the garment. The style preferences can include garment style, fashion preferences, most flattering colors, and favorite colors. The user can also select the type of garment, such as a shirt, a pant, a short, a dress, a shoe, a hat, a sweater, a bra, an undergarment, a swimsuit, eyewear or a jacket, and whether they have a preference for made-to-order or off-the-rack apparel.

The illustrative screen shot of FIG. 9 allows the customer to enter their measurement information. The measurement information can be entered automatically via the body scanner.

The host program creates a customer profile including the received customer information and stores the customer profile in the database (step 504). The database maintains entries for each customer of the system. Therefore, when a customer reuses the system, their previously-entered customer profile can be retrieved.

Then, the host program performs a figure analysis using the information in the customer profile (step 506). As described above, the customer profile includes the customer's inputted body shape (e.g., body type A—broad shoulders and large bust) and secondary figure goals (e.g., minimize broad shoulders). The host program determines whether the inputted body shape is correct by comparing the inputted body shape to a computed body shape. This is performed because the customer may not know or may not enter their correct body shape. The computed body shape can be calculated in a variety of ways. In the illustrative example, the host program determines the computed body shape by determining whether the ratios of certain body measurements exceed respective thresholds. For example, if the ratio of the customer's shoulder measurement to the customer's bust measurement is greater than 1.2:1, then the customer has an "A" body type. As shown in FIG. 7, the A body type is associated with broad shoulders and a large bust. In another illustrative example, if the ratio of the bust measurement to the hip measurement is 1:1, then the customer has an "E" body shape, which is associated with an hourglass figure.

By determining the customer's correct body shape, the host program can make style suggestions to accommodate the secondary figure goals entered by the customer or that are typically associated with the customer's body shape (step 508). For example, the A body shape is associated with broad shoulders and a large bust. Knowing this, the host program can suggest styles that, for example, minimize the look of the customer's bust or shoulders. As shown in FIG. 7, some illustrative style suggestions can include visually lengthening or shortening the torso; minimizing full hips or thighs; providing extra tummy control; enhancing, supporting or minimizing the bust; deemphasizing full arms or legs; creating waist definition; balancing broad shoulders or hips; accommodating petite, tall or plus size fits; and enhancing a flat buttocks or deemphasizing a pronounced buttocks.

To make style suggestions, the host program, for example, looks to a secondary figure goal table that is stored in the host data processing system's memory. The secondary figure goal table can include, for example, the entries shown in the table in FIG. 7. In FIG. 7, the secondary figure goals associated with typical body shapes are identified by an "x." Knowing the customer's body shape, the host program identifies relevant secondary figure goals associated with that body shape. In the illustrative example shown in FIG. 7, if the customer has the A body shape, the host program would determine the secondary figure goals of minimizing broad shoulders, minimizing large bust, providing bust support, and supporting flat seat. The host program then compares the secondary figure goals identified in the table with those entered by the customer to narrow down what the customer's fashion objectives.

After determining the body shape and secondary figure goals, the host program identifies apparel silhouettes from the database that accommodate the customer's fashion preferences, flatter the body type, and achieve the secondary figure goals. An apparel silhouette is a generic garment shape or type and can represent either a made-to-order garment or an off-the-rack garment. The apparel silhouettes are stored in the database by fashion preferences and according to their relevance for each of the identified body shapes and secondary figure goals. Apparel silhouettes are also associated in the database with additional information, including but not limited to sizing (e.g., extra small, small, medium, large, extra large, and plus), cup sizes (e.g., AA, A, B, C, D, and DD+), fabrics (e.g., solids, prints, colors, material content), hardware options (e.g., brushed gold and brushed silver), structure options (e.g., power mesh, leg lengthener, extra coverage, underwires, lining, straps, back patterns, and style details), other option and accessories.

Figure 10:
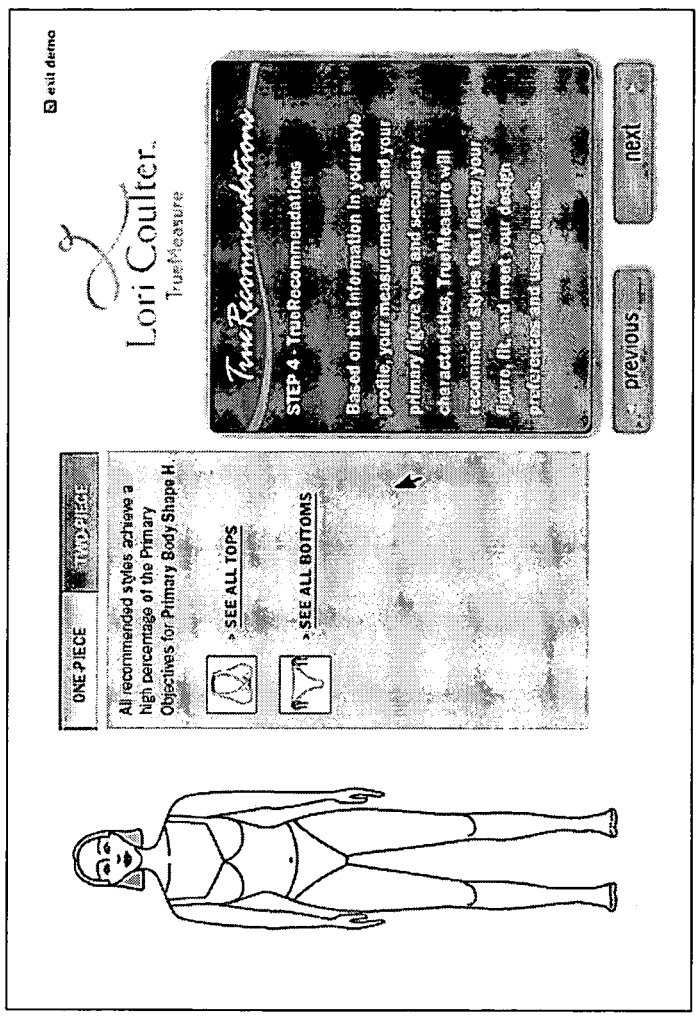
FIG. 10 is a screen shot of a client computer display screen that displays the host program recommendations.
Figure 11:
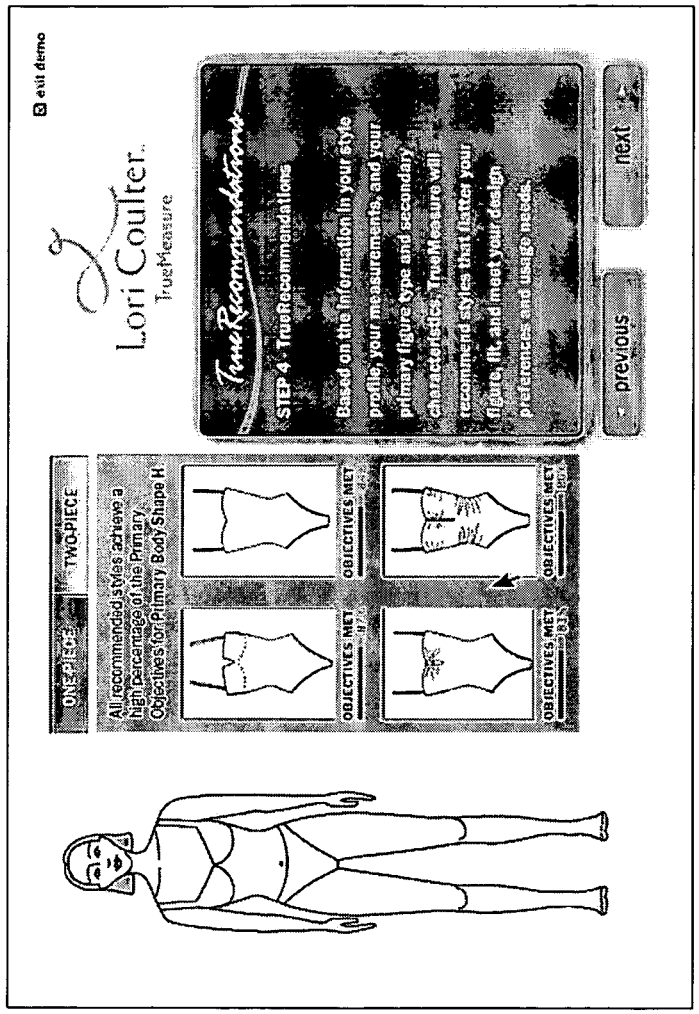
FIG. 11 is a screen shot of a client computer display screen that displays other host program recommendations.

The host program identifies apparel silhouettes that most closely correspond to the customer's fashion preferences, primary body type and secondary figure goals. Then, the host program ranks the identified apparel silhouettes to meet the customer's preferences and displays them on the customer's client data processing system display device via the web site. FIG. 10 shows an illustrative screen shot for an illustrative example in which the customer is shopping for one-piece swimwear. As shown, the host program displays prompts for the customer to select whether to see the recommended swimwear tops or recommended swimwear bottoms. The illustrative screen shot shows that the host program provided recommendations to achieve a high percentage of the primary objectives for body shape H. By selecting either of those prompts, the customer can then view the recommended silhouettes. FIG. 11 shows an illustrative screen shot for an illustrative example in which the customer is shopping for two-piece swimwear. As shown in this case, the host program displays a number of silhouettes with percentage values, which indicate the percentage at which the customer's primary objectives were met.

The customer can virtually try-on the apparel silhouettes using a virtual model that is displayed in a virtual dressing room on the web site. The virtual model is generated by the host program and has a body shape similar to the customer's body shape. This can be done, for example, by using the three-dimensional body scan of the customer. Alternatively, the host program can choose from a number of two-dimensional and three-dimensional models, which are associated with various body shapes, that are stored in the database. The shape of the virtual model can be adjusted to approximate the customer's inputted measurements. The virtual model is displayed with each individual apparel silhouette that the customer selects. The customer may ask for more suggested silhouettes until the entire set of silhouettes has been suggested or until the customer selects one of the silhouettes with which to proceed.

Figure 12:
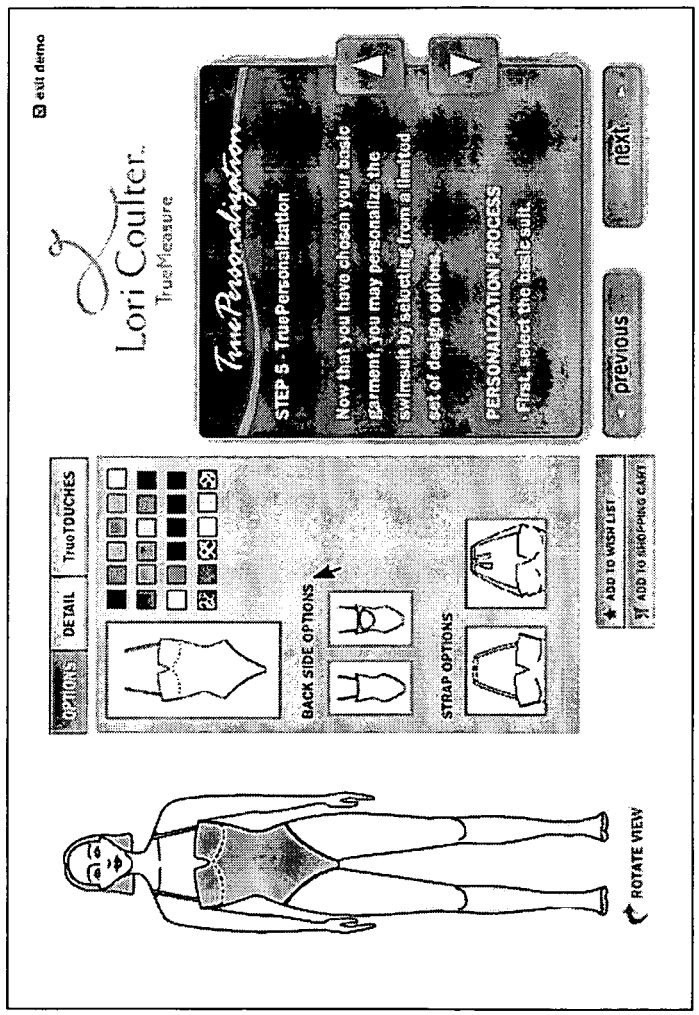
FIG. 12 is a screen shot of a client computer display screen that prompts the customer to enter their options.
Figure 13:
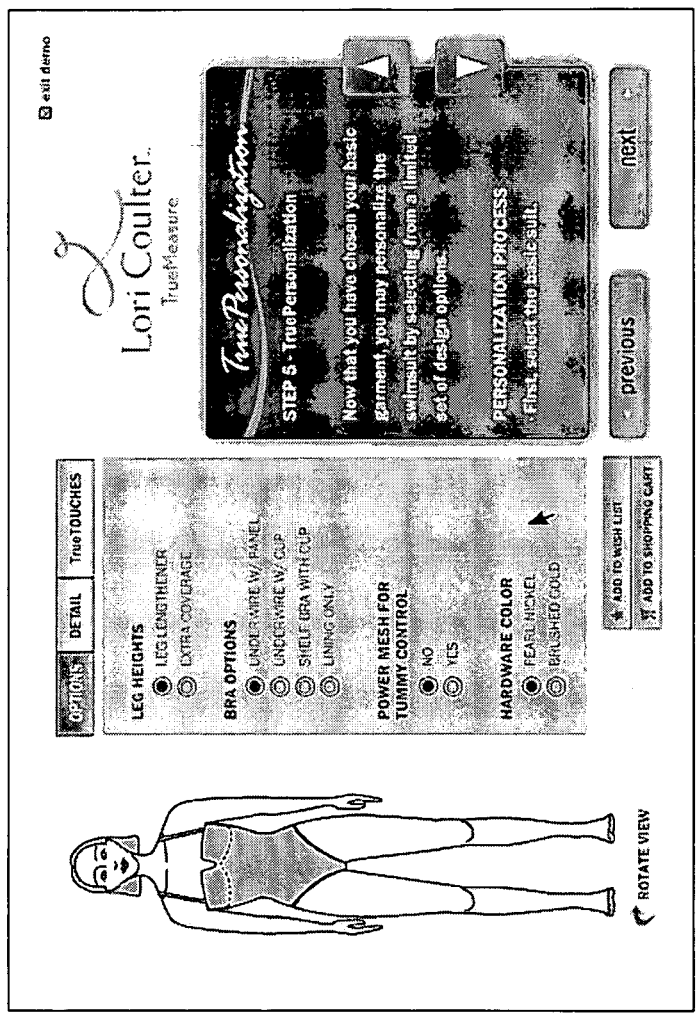
FIG. 13 is a screen shot of a client computer display screen that prompts the customer to enter other options.
Figure 14:
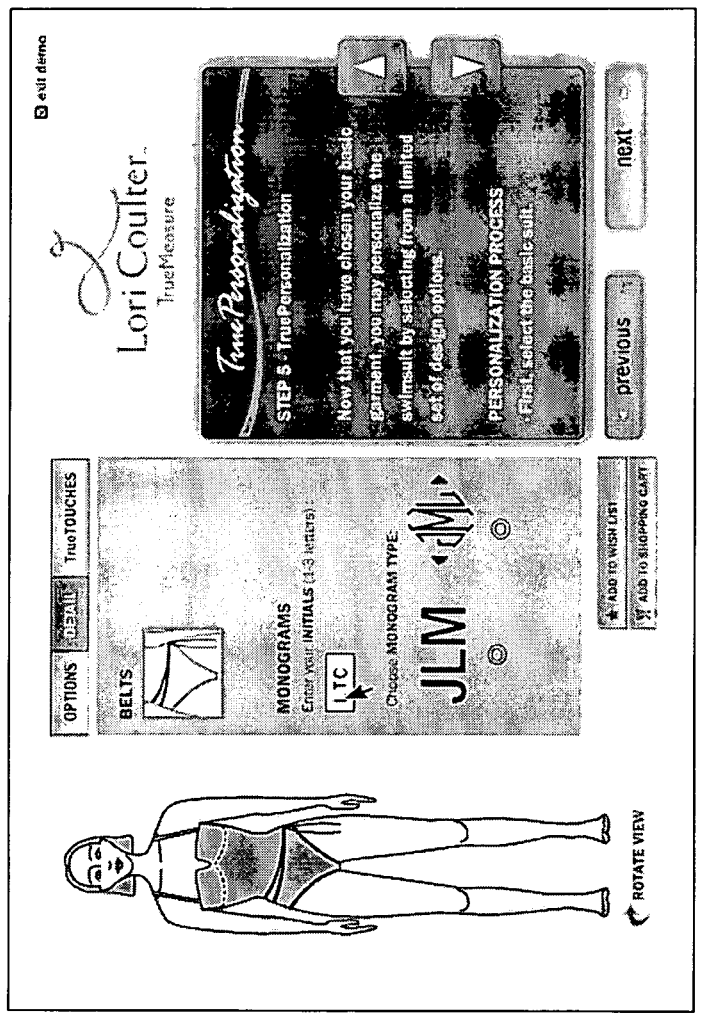
FIG. 14 is a screen shot of a client computer display screen that prompts the customer to enter additional options.

Once the customer has chosen a silhouette, the host program displays garment personalization options for the customer (step 510). Personalization options include, for example, neckline, leg height, bra, tummy control, straps, fabric, and finishing design features such as contrasting trim colors, monogramming, logos, charms, and beaded strings. FIGS. 12-14 display illustrative screen shots presented by the host program that allow the customer to select various options associated with their selected silhouette. In the illustrative example, the customer is shopping for swimwear. The illustrative screen shot of FIG. 12 presents color, pattern, back and strap options for the customer to choose from. The screen shot of FIG. 13 presents leg height options, bra options, power mesh for tummy control options, and hardware color options. In the illustrative screen shot of FIG. 14, the customer is presented with details to choose from, such as belt and monogram options. The host program can display the virtual model wearing the silhouette with each option that the customer chooses in the virtual dressing room on the web site (step 512).

If the host program receives an input from the customer that the customer would like to add an item to the customer's wish list or shopping cart (step 514), then the host program adds the apparel item to the customer's wish list or shopping cart (step 516). The customer's wish list and shopping cart are maintained at the database so that the customer can return to the web site at a later time to continue shopping. The wish list is a list of items that the customer identifies as desirable items, but that have not been included in the shopping cart for purchase. Items can be transferred between the wish list and the shopping cart.

Figure 15:
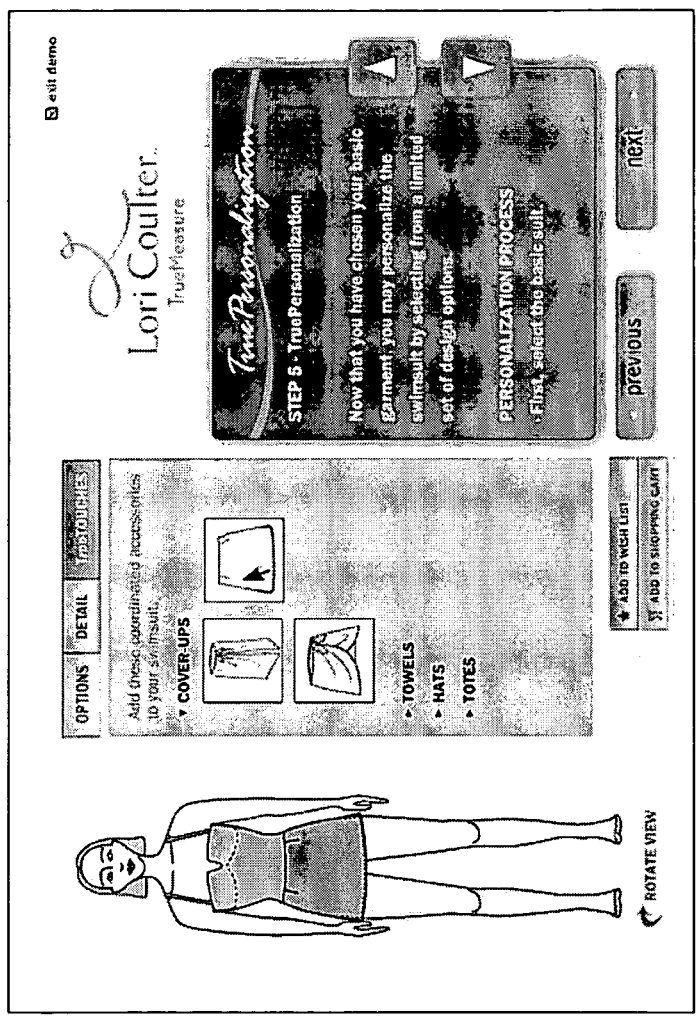
FIG. 15 is a screen shot of a client computer display screen that prompts the customer to enter their accessories.

After an item has been added to the wish list or shopping cart, the host program displays suggestions for coordinating accessories for the particular apparel item (step 518). For example, if the customer has added a swimsuit to the shopping cart, the host program can display suggestions for wraps that would accessorize the swimsuit. To do so, the host program looks-up accessories in the database that are identified as being relevant to the apparel item and displays the accessories on the web site. The accessories can also be displayed along with apparel item in the virtual dressing room. The customer can add one or more of the accessories to the customer's shopping cart or wish list. FIG. 15 shows an illustrative screen shot presented by the host program that allows the customer to select various accessories associated with their selected silhouette. In the illustrative example, the customer is shopping for swimwear. The illustrative screen shot of FIG. 15 presents cover-up, towel, hat, and tote options.

If the host program receives an input that the customer wants to continue shopping (step 520) or that the customer did not want to add an item to the shopping cart or wish list in step 514, then the program flow returns to step 508 to present additional style suggestions to the customer. If the customer does not want to continue shopping in step 520, then the host program determines an estimated delivery date of the items in the shopping cart (step 522). In the illustrative embodiment, the estimated delivery date is a predetermined time (e.g., four weeks) in the future. However, the estimated delivery date can be estimated in an alternative manner. For example, an estimated delivery date can be associated with each garment in the database.

If the customer does not accept the delivery date (step 524), then the host program determines whether the customer wants to end the session (step 526). If the customer does not want to end the session in step 526, program flow returns to step 520 to determine whether the customer wants to continue shopping. However, if the customer accepts the delivery date in step 524, then the host program processes the customer's order (step 528). When processing the order, the host program prepares an order summary to send to the apparel manufacturer. The host program also provides the customer with the order summary and the customer's figure analysis (step 530). The customer information and purchase information is added to the database for use in future shopping sessions and for market research purposes (step 532).

Referring back to FIG. 4, after the order is processed in step 402, the host program sends the garment specifications for the customer's order to an apparel manufacturer or apparel provider (step 404). In the illustrative example, once an order has been completed, a host program user (e.g., an administrator or attendant) is notified via email about the order. The host program user verifies whether the order was entered correctly and whether the information is valid. Further, if the garment is a made-to-order garment, the host program user can input the customer's specifications and measurements into a made-to-measure software, such as Modulate-Made-To-Measure software, which converts the specifications and measurements into a garment pattern. Then, if the order is correct, the host program user notifies the host program that the order summary can be sent to the apparel manufacturer. Modulate-Made-To-Measure is manufactured by OptiTex USA, Inc. of New York, N.Y., USA.

Figure 16:
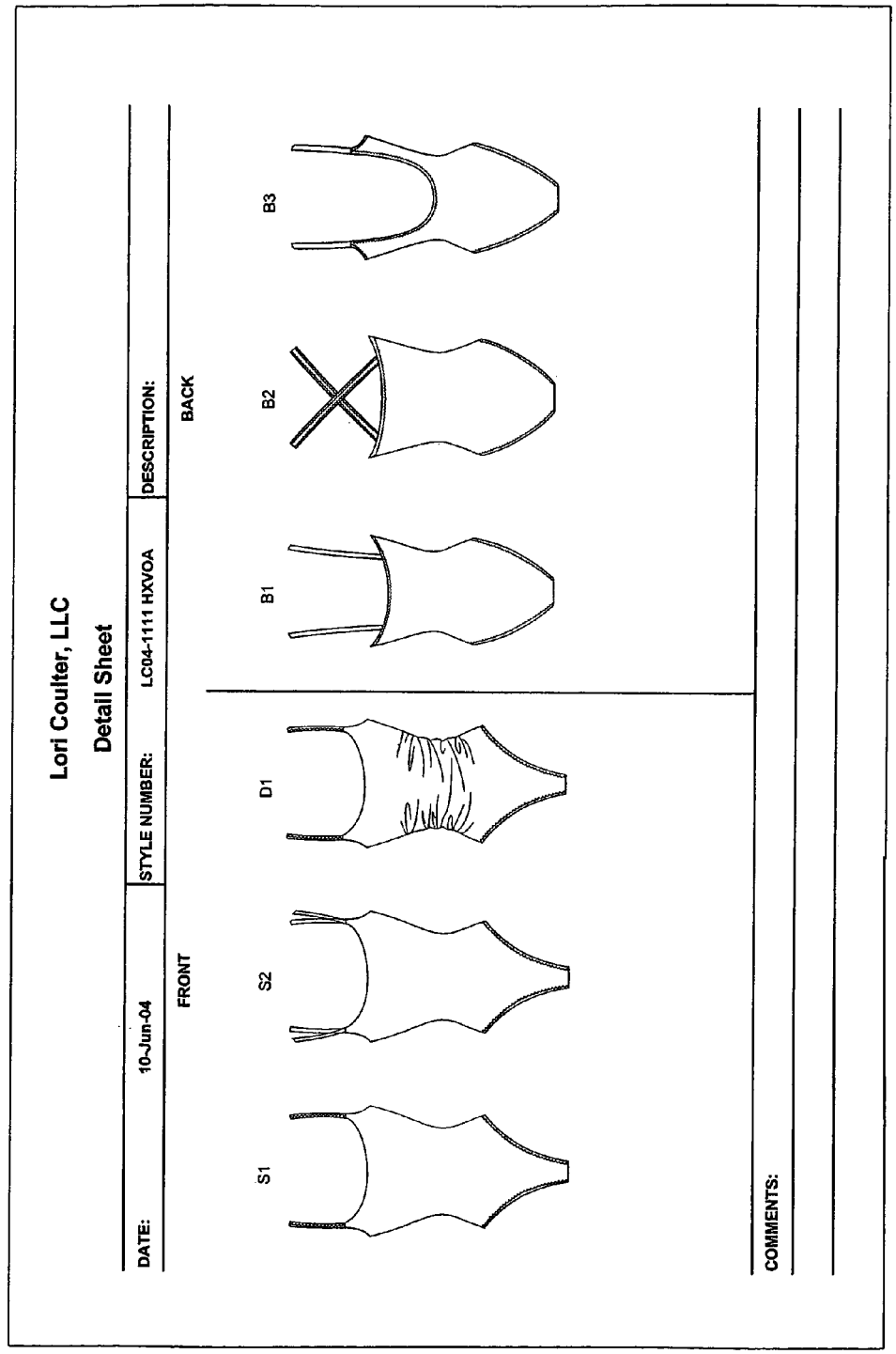
FIG. 16 is an illustrative order summary.

The order summary includes, for example, the customer's body measurements, accessories, patterns, apparel options, shipping information, and other order information. An illustrative example of a part of an order summary is shown in FIG. 16. The illustrative partial order summary of FIG. 16 is for an order for a particular model of swimsuit. As shown, the illustrative swimsuit includes options for two types of straps S1 and S2, a type of detailing D1, and three types of backs B1, B2 and B3. One or more of these options may be indicated in the order summary based on selections received from the customer. As described above, each garment can be associated with a number of options and accessories. The selected options and accessories are included in the order summary.

The host program can either automatically send the order summary to the manufacturer at that time or hold onto the order to send a group of orders at a later time. In the illustrative example, the order summary is an eXtensible Markup Language (XML™) file and is transferred via the wide-area network to the manufacturer's data processing system 120. XML is a trademark of Massachusetts Institute of Technology, Institut National de Recherche en Informatique et en Automatique, or Keio University on behalf of the World Wide Web Consortium. All other product names used herein may be trademarks of their respective owners.

The manufacturer receives the order summary and produces the apparel item either built to the measurements provided in the order summary or selected as an off-the-rack item. Further, the manufacturer may add accessories, patterns, and other options, which may be identified in the order summary, in the final product. Once the apparel item is completed, the manufacturer ships the apparel item to the shipping address specified in the order summary.

Thus, unlike conventional apparel shopping methods, methods, systems and articles of manufacture consistent with the present invention objectively recommend garments that can visually enhance characteristics of a person's body shape. The customer does not have to rely on the subjective opinion of a salesperson. Further, conventional apparel shopping typically involves recommending tailoring modifications to off-the-rack garments with no object advice on flattering the customer's figure. Methods, systems, and articles of manufacture consistent with the present invention recommend and provide made-to-order or off-the-rack garments that flatter the customer's figure based on decisions made during the customer's ordering session. Therefore, the garment is more customized to the customer's fit and fashion preferences than typical made-to-order or off-the-rack garments.

The foregoing description of an implementation of the invention has been presented for purposes of illustration and description. It is not exhaustive and does not limit the invention to the precise form disclosed. Modifications and variations are possible in light of the above teachings or may be acquired from practicing the invention. For example, the described implementation includes software but the present implementation may be implemented as a combination of hardware and software or hardware alone. Further, the illustrative processing steps performed by the program can be executed in an different order than described above, and additional processing steps can be incorporated. The invention may be implemented with both object-oriented and non-object-oriented programming systems. The scope of the invention is defined by the claims and their equivalents.

When introducing elements of the present invention or the preferred embodiment(s) thereof, the articles "a", "an", "the" and "said" are intended to mean that there are one or more of the elements. The terms "comprising", "including" and "having" are intended to be inclusive and mean that there may be additional elements other than the listed elements.

As various changes could be made in the above constructions without departing from the scope of the invention, it is intended that all matter contained in the above description or shown in the accompanying drawings shall be interpreted as illustrative and not in a limiting sense

What is claimed is:

1. A method in a data processing system, the method comprising the steps of:
    obtaining at least one of a person's body measurements, clothing sizes and combinations thereof, by means of a computer system of the data processing system configured through program instructions stored on a computer-readable storage medium and executable by the computer system to select a garment from a collection containing a number of garments each of which is categorized as being within one or more garment types;
    determining, via the computer system, a computed body shape type from a plurality of predetermined body shape types based on the at least one of a person's body measurements, clothing sizes and combinations thereof;
    receiving, via the computer system, an inputted body shape type selected from the plurality of predetermined body shape types as input from the user;
    prompting, via the computer system, the user to enter a figure goal that complements a figure characteristic associated with the inputted body shape type;
    receiving, via the computer system, the figure goal as an input from the user;
    determining, via the computer system, whether the inputted body shape type is correct by comparing the inputted body shape type to the computed body shape type;
    receiving, via the computer system, a fashion preference as an input from the user with regard to at least one of style, usage, color, and print;
    identifying, via the computer system, at least one garment type that complements the figure characteristic in accordance with the received figure goal and the fashion preference;
    identifying, via the computer system, one or more garments within the collection that are categorized as being within the identified complementary garment type and that correspond to the person's body shape;
    recommending, via the computer system, the identified one or more garments; and
    receiving, via the computer system, an input corresponding to a desired garment selected from the recommended identified one or more garments, wherein the received figure goal includes goals to enhance the figure characteristic and make the figure characteristic appear at least one of more defined, minimized, accommodated, enhanced, minimized, supported, controlled, covered, larger, smaller, longer, shorter, fuller and narrower, and the at least one figure characteristic is selected from the group consisting of shoulders, bust, hip, thighs, waist, tummy, seat, legs, arms, torso length, back, and size.

2. The method of claim 1, wherein the identified garment type that complements the figure characteristic visually emphasizes the figure characteristic.

3. The method of claim 1, wherein the identified garment type that complements the figure characteristic visually deemphasizes the figure characteristic.

4. The method of claim 1, wherein at least one of a person's body measurements, clothing sizes and combinations thereof is obtained by performing a three-dimensional scan of the person's body.

5. The method of claim 1, wherein the recommended one or more garments each comprise at least one of a shirt, a pant, a short, a dress, a shoe, a hat, a sweater, a bra, an undergarment, a swimsuit, eyewear, and a jacket.

6. The method of claim 1, further comprising the steps of:
    displaying, via the computer system, the recommended identified one or more garments.

7. The method of claim 1, further comprising the steps of:
    recommending, via the computer system, at least one option for modifying the desired garment; and receiving, via the computer system, an input regarding the option for modifying the desired garment.

8. The method of claim 1, further comprising the steps of:
    recommending, via the computer system, at least one accessory to the desired garment;
    and receiving, via the computer system, an input regarding the recommended accessory to the desired garment.

9. The method of claim 1, further comprising the step of: receiving an order for the desired garment.

10. The method of claim 1, further comprising the step of: displaying, via the computer system, a model of the desired garment on a simulation of the person's body shape.

11. The method of claim 1, further comprising the step of: manufacturing the desired garment.

12. The method of claim 1, further comprising the step of: providing the desired garment to the person.

13. The method of claim 1, further comprising the step of: storing the person's body shape information in a database.

14. The method of claim 1, further comprising the step of: storing information for manufacturing the desired garment in a database.

15. The method of claim 1, further comprising the step of: ordering the desired garment.

16. The method of claim 1, wherein the desired garment is a made-to-order garment.

17. The method of claim 1, wherein the desired garment is a pre-made garment.

18. A computer-readable medium containing program instructions that cause a data processing system to perform a method for selecting a garment from a collection containing a number of garments each of which is categorized as being within one or more garment types, the method comprising the steps of:
    obtaining at least one of a person's body measurements, clothing sizes and combinations thereof;
    determining a computed body shape type from a plurality of predetermined body shape types based on the at least one of a person's body measurements, clothing sizes and combinations thereof;

receiving an inputted body shape type selected from the plurality of predetermined body shape types as an input from the user;

prompting the user to enter a figure goal that complements a figure characteristic associated with the inputted body shape type;

receiving the figure goal as an input from the user;

determining whether the inputted body shape type is correct by comparing the inputted body shape type to the computed body shape type;

receiving a fashion preference as an input from the user with regard to at least one of style, usage, color, and print;

identifying at least one garment type that complements the figure characteristic in accordance with the received figure goal and the fashion preference;

identifying one or more garments within the collection that are categorized as being within the identified complementary garment type and that correspond to the person's body shape;

recommending the identified one or more garments; and receiving an input corresponding to a desired garment selected from the recommended identified one or more garments, wherein, the received figure goal includes goals to enhance the figure characteristic and make the figure characteristic appear at least one of more defined, minimized, accommodated, enhanced, minimized, supported, controlled, covered, larger, smaller, longer, shorter, fuller and narrower, and the at least one figure characteristic is selected from the group consisting of shoulders, bust, hip, thighs, waist, tummy, seat, legs, arms, torso length, back, and size.

19. The computer-readable medium of claim 18, wherein the identified garment type that complements the figure characteristic visually emphasizes the figure characteristic.

20. The computer-readable medium of claim 18, wherein the identified garment type that complements the figure characteristic visually deemphasizes the figure characteristic.

21. The computer-readable medium of claim 18, wherein at least one of a person's body measurements, clothing sizes and combinations thereof the person's body shape information is obtained by performing a three-dimensional scan of the person's body.

22. The computer-readable medium of claim 18, wherein the recommended one or more garments each comprise at least one of a shirt, a pant, a short, a dress, a shoe, a hat, a sweater, a bra, an undergarment, a swimsuit, eyewear, and a jacket.

23. The computer-readable medium of claim 18, further comprising the steps of: displaying the recommended identified one or more garments.

24. The computer-readable medium of claim 18, further comprising the steps of: recommending at least one option for modifying the desired garment; and receiving an input regarding the option for modifying the desired garment.

25. The computer-readable medium of claim 18, further comprising the steps of: recommending at least one accessory to the desired garment; and receiving an input regarding the recommended accessory to the desired garment.

26. The computer-readable medium of claim 18, further comprising the step of: receiving an order for the desired garment.

27. The computer-readable medium of claim 18, further comprising the step of: displaying a model of the desired garment on a simulation of the person's body shape.

28. The computer-readable medium of claim 18, further comprising the step of: manufacturing the desired garment.

29. The computer-readable medium of claim 18, further comprising the step of: providing the desired garment to the person.

30. The computer-readable medium of claim 18, further comprising the step of: storing the person's body shape information in a database.

31. The computer-readable medium of claim 18, further comprising the step of:
storing information for manufacturing the desired garment in a database.

32. The computer-readable medium of claim 18, further comprising the step of: ordering the desired garment.

33. The computer-readable medium of claim 18, wherein the desired garment is a made-to-order garment.

34. The computer-readable medium of claim 18, wherein the desired garment is a pre-made garment.

35. A data processing system for selecting a garment from a collection containing a number of garments each of which is categorized as being within one or more garment types, the data processing system comprising:
a memory having a program that
obtains at least one of a person's body measurements, clothing sizes and combinations thereof,
determines a computed body shape type from a plurality of predetermined body shape types based on the at least one of a person's body measurements, clothing sizes and combinations thereof,
receives an inputted body shape type selected from the plurality of predetermined body shape types as an input from a user,
prompts the user to enter a figure goal that complements a figure characteristic associated with the person's inputted body shape type,
receives the figure goal as an input from the user,
determines whether the inputted body shape type is correct by comparing the inputted body shape type to the computed body shape type,
receive a fashion preference as an input from the user with regard to at least one of style, usage, color, and print,
identifies at least one garment type that complements the figure characteristic in accordance with the received figure goal and the fashion preference,
identifies garments within the collection that are categorized as being within the identified complimentary garment type and that corresponds to the person's body shape,
recommends the identified garments, and
receives an input corresponding to a desired garment selected from the recommended identified garments; and
a processing unit that runs the program,
wherein,
the received figure goal includes goals to enhance the figure characteristic and make the figure characteristic appear at least one of more defined, minimized, accommodated, enhanced, minimized, supported, controlled, covered, larger, smaller, longer, shorter, fuller and narrower, and
the at least one figure characteristic is selected from the group consisting of: shoulders, bust hip, thighs, waist, tummy, seat, legs, arms, torso length, back, and size.

36. A data processing system for selecting a garment from a collection containing a number of garments each of which is categorized as being within one or more garment types, the data processing system comprising:

means for obtaining at least one of a person's body measurements, clothing sizes and combinations thereof;

means for determining a computed body shape type from a plurality of predetermined body shape types based on the at least one of a person's body measurements, clothing sizes and combinations thereof;

means for receiving an inputted body shape type selected from the plurality of predetermined body shape types as an input from a user;

means for prompting the user to enter a figure goal that compliments a figure characteristic associated with the inputted body shape type;

means for receiving the figure goal as an input from the user;

means for determining whether the inputted body shape type is correct by comparing the inputted body shape type to the computed body shape type;

means for receiving a fashion preference as an input from the user with regard to at least one of style, usage, color, and print;

means for identifying at least one garment type that complements the received figure characteristic and the fashion preference;

means for identifying garments within the collection that are categorized as being within the identified complementary garment type and that correspond to the person's body shape;

means for recommending the identified garments; and means for receiving an input corresponding to a desired garment selected from the recommended identified garments, wherein, the received figure goal includes goals to enhance the figure characteristic and make the figure characteristic appear at least one of more defined, minimized, accommodated, enhanced, minimized, supported, controlled, covered, larger, smaller, longer, shorter, fuller and narrower, and the at least one figure characteristic is selected from the group consisting of: shoulders, bust, hip, thighs, waist, tummy, seat, legs, arms, torso length, back, and size.

37. The method of claim 1, wherein the computed body shape type is determined by determining whether ratios of body measurements exceed respective thresholds.

* * * * *